United States Patent Office 3,261,824
Patented July 19, 1966

3,261,824
FIBER REACTIVE ORGANIC DYESTUFFS
David Irwin Randall, New Vernon, and Wilhelm Schmidt-Nickels, Little York, N.J., assignors to General Aniline & Film Corporation, New York, N.Y., a corporation of Delaware
No Drawing. Filed Dec. 31, 1962, Ser. No. 248,244
10 Claims. (Cl. 260—152)

This invention relates to a novel fiber-coloring process, and to a novel group of chromophoric compounds useful in such process.

A number of dyeing processes are known in which dyeings of improved fastness properties are obtained by reaction between the dyestuff and the fiber. Among the large number of types of reactive dyes proposed for use in such processes, only a few are commercially useful. These are the cyanuric, the pyrimidine, and the vinylsulfone or sulfatoethylsulfone types. Because of the relative scarcity of such dyestuffs and/or their substantial unavailability to large sections of the dyeing trade and/or various disadvantages inherent in their use with respect to procedure, cost, and/or results obtained, there exists a definite need in the industry for new and improved types of reactive dyestuffs and/or methods of dyeing therewith.

It is an object of this invention to provide a novel process for coloring fibers and other articles in any desired shades of improved fastness properties. Another object of this invention is the provision of a novel group of chromophoric compounds useful in such process. Still another object of this invention is the provision of methods for making such chromophoric compounds. A further object of this invention is the provision of novel colored fibers. A still further object of this invention is the provision of such processes, compounds, and colored products, which will not be subject to one or more of the above disadvantages and which will depend upon a reaction between the chromophoric compound and the fibers. Other objects and advantages will appear as the description proceeds.

The attainment of the above objects is made possible by this invention which is based upon the discovery that colored fibers with improved properties can be obtained by treating fibers containing a reactive hydrogen atom with an organic dyestuff containing in the molecule at least one radical which has the formula (I) 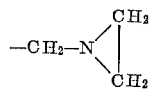

The fiber-reactive radical shown in the above formula has been found to be unexpectedly effective in enabling the addition reaction of chromophoric compounds (including dyestuffs per se) containing the same with fibers containing a reactive hydrogen atom in the fiber molecule and production of colored fibers with improved properties with respect to fastness to such deteriorating influences as wet treatments, alkaline and acid conditions, laundry sours, chlorine and/or light and the like. The present invention accordingly not only resides in the provision of the foregoing process and the colored fibers resulting therefrom, but also in the provision of the chromophoric compounds useful in such process.

As a chromophoric compound into which such fiber-reactive radical or radicals may be inserted in accordance with this invention there may be employed any known organic dyestuff. Such dyestuffs are generally of aromatic character in containing at least one carbocyclic or heterocyclic ring, and may generally be selected from among dyestuffs of the azo, quinoid (including anthraquinone, dibenzanthrone, other polycyclic ketones and substituted derivatives thereof), indigoid, thioindigoid, di- and tri-aryl (e.g. phenyl) methane, nitro, phthalocyanine, stilbene, and sulfur dyestuffs. Venkatarman's "Chemistry of Synthetic Dyes," Academic Press, N.Y., 1952, Volumes I and II, discloses a multiude of such organic dyestuffs into which such fiber-reactive radicals of the formula shown above can be inserted in known manner. Further examples of dyestuffs into which the above defined fiber-reactive radicals may be inserted are also disclosed generically and specifically in, for example, U.S. Patents 2,657,205, 2,892,670, 2,892,671, 2,928,711, 2,940,812, 2,978,289, 3,029,123, 3,031,252, and 3,042,477, and such disclosures, so far as they relate to chromophoric compounds or dyestuffs into which fiber-reactive groups may be inserted, are incorporated herein by reference thereto.

Optionally, the chromophoric compounds into which the above defined fiber-reactive radical or radicals are inserted may be colorless compounds containing groups enabling conversion to colored compounds or dyestuffs in situ on the fiber, as for example, a group promoting coupling with a diazotized primary aromatic amine or a diazotizable primary amine group whereby the color may be produced in situ on the fiber after reaction of the fiber-reactive radical-containing chromophoric compound with the fiber by suitable development as by, respectively, reaction with a diazotized primary aromatic amine or diazotization and reaction with a coupling component. Other mechanisms and/or groupings are of course known for developing color in situ on the fiber, including metallizing, reducing and/or oxidizing treatments and the like. It is to be understood that such colorless compounds are to be considered equivalent to the above described dyestuffs in carrying out the teachings of this invention.

In the above defined fiber-reactive cyclic ethylene-iminomethyl radical of Formula I, it will be understood that one or more of the depicted carbon-bonded hydrogens may be substituted by lower alkyl of 1 to 4 carbon atoms, the corresponding acetylenically unsaturated alkyls (alkynyl), the corresponding ethylenically unsaturated alkyls (alkenyl), benzyl, cycloalkyl such as cyclohexyl and cyclopentyl, phenyl, naphthyl, heterocyclic such as furyl, which inert substituents may be further substituted or chain-interrupted by other inert groups or heteroatoms.

As will appear more fully below, the fiber-reactive radicals of the present invention are inserted into dyestuffs and chromophoric compounds by reaction of such dyestuffs and compounds containing at least one and up to four or more sulfatoethylaminomethyl groups of the formula (II) 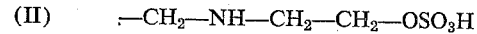

with a strong base such as caustic soda or caustic potash at a pH of about 12–14 whereby each such group of Formula II is cyclized to that of the Formula I with liberation of $H_2SO_4$.

More particularly, a phthalocyanine such as copper phthalocyanine is chloromethylated with up to four, preferably two, chloromethyl groups by known reaction with bis-chloromethyl ether in sulfuric acid or with formaldehyde, zinc chloride and HCl to produce a compound of the formula (III) 

wherein D represents the dyestuff molecule, here copper phthalocyanine, and $n$ represents the number of chloromethyl groups inserted therein.

The above compound of Formula III, $n$ being for example two, is then reacted in the presence of an acid binding agent with two moles of monoethanolamine, to produce a compound containing two hydroxyethylamino-methyl groups of the formula (IV) $\quad D(-CH_2-NH-CH_2-CH_2-OH)_2$ Reaction of the compound of Formula IV with a sulfating agent such as a complex compound of sulfur trioxide with a tertiary organic amine, for example pyridine-CO$_3$ complex, yields (V) $\quad D(-CH_2-NH-CH_2-CH_2-OSO_3H)_2$ Desirably, compound IV is reacted with a combined sulfonating-sufating agent such as oleum of 2–20% strength at 100° C. or so, whereby the dyestuff is simultaneously water-solubilized by sulfonation, the D moiety in Formula V being provided with one or two sulfonic (SO$_3$H) groups.

The compound of Formula V is then finally treated with strong base at pH of about 12–14 as described above to yield the desired fiber-reactive dyestuff of the formula (VI)
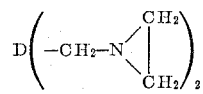

The same procedure can be followed starting for example with a vat dyestuff such as dibenzanthrone, D in the above Formulae III–VI then representing the nuclearly substituted dibenzanthrone molecule.

Another and preferred expedient for the production of fiber-reactive dyestuffs sensitive to chloromethylating conditions or difficult to chloromethylate involves reacting a chloromethylated nitroaromatic compound with sufficient monoethanolamine to convert all the chloromethyl groups to hydroxyethylaminomethyl groups, followed by subjecting the resulting intermediate to known reducing conditions, as by catalytic hydrogenation in the presence of platinum oxide catalyst, to convert the nitro group to amino, the compound thus having the formula (VII) $\quad H_2N-Ar(-CH_2NH-CH_2-CH_2-OH)_n$ wherein Ar represents the nuclear residue of the nitroaromatic compound such as diphenyl, diphenylether, naphthalene, anthracene, or preferably benzene, or their derivatives containing up to 4 halogen (Cl, Br, F, or I), lower alkyl (methyl to butyl and isomers thereof), or corresponding alkoxy groups, and $n$ represents the number of CH$_2$Cl groups originally present therein. Such chloromethylated nitrobenzenes are known compounds generally being mono- or bis-chloromethylated in meta position relative to the nitro group in the same nucleus.

The above intermediate of Formula VII may be employed in a number of different ways in carrying out the teachings of the present invention. For example, it is readily diazotized and coupled in known manner, before or after sulfation, with any desired azo coupling component, a multitude of which are known in the art and disclosed for example in the above cited Venkataraman reference, to produce azo dyestuffs which after cyclization with strong base have the formula (VIII)
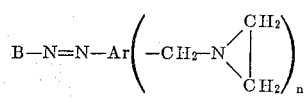

wherein B is the residue of the azo coupling components and $n$ is 1–4. The resulting azo dyestuffs is readily reacted with fibers containing a reactive hydrogen atom for the production of colored fibers represented by the formula (IX) $\quad B-N=N-Ar(-CH_2-NH-CH_2-CH_2-Fiber)_n$ wherein "Fiber" represents a reactive hydrogen-containing fiber molecule deprived of said reactive hydrogen atom. Dyestuffs or chromophoric compounds containing a plurality of fiber-reactive radicals, when applied to fibers in accordance with the present invention enable the attainment of further improved fastness properties in the colored products due to cross-linking between the fibers. In general, the colored fibers produced by the present process may be represented by the formula (X) $\quad D(-CH_2-NH-CH_2-CH_2-Fiber)_n$ wherein D represents the chromophoric compound (e.g. organic dyestuff molecule), "Fiber" is as defined above, and $n$ has an average value of 1 to 4.

As stated, any azo coupling component may be employed to provide the B component in the azo dyestuffs of Formula VIII above. The identity and characteristics of such coupling components have been well documented, as for example see Volume I of Venkataraman, cited above, beginning at page 409. Generally, such compounds are capable of coupling by reason of an anionoid or nucleophilic center in the compound at which coupling with the diazo component takes place. An important group of azo coupling components are the carbocyclic and heterocyclic compounds containing a nuclearly substituted hydroxy or amino group directing coupling in ortho or para position thereto. Usually, the diazonium coupling reaction with these coupling components is explicable by a mechanism which is in consonance with the accepted theory of aromatic substitution. The yield in the coupling reaction depends on the electronegativity and accessibility of the site in the carbocyclic or heterocyclic compound at which the attachment of the diazonium group is to take place and on the pH of the reaction mixture which may fall within the acid, neutral or basic range depending upon the particular coupling component employed. The diazonium group attacks a position which has been activated as a site of high electron density. Coupling therefore takes place in the ortho or para position to the directing hydroxyl or amino group in the coupling component. If both of these positions are occupied, no coupling will take place or one of the substituents will be displaced.

Another important group of azo coupling components are the heterocyclic compounds containing a reactive nuclear methylene group usually associated with an adjacent keto group (keto-methylene linkage) as in the 5-pyrazolones.

Still another important group of azo coupling components are the compounds containing an aliphatic or alicyclic keto-methylene group as in the acylacetic acid arylides and esters.

As examples of suitable azo coupling components falling within the above classifications, there may be mentioned aniline, toluidine, 2-naphthylamine, 2-naphthol, 1-amino-7-naphthol, and other amine and/or hydroxy containing benzenes, naphthalenes and other mono- and polycarbocyclic and -heterocyclic aromatic compounds including pyrroles, indoles, 2-hydroxycarbazoles, 3-hydroxydibenzofurans, 2-naphthol-3-carboxylic acid arylamides, amino and hydroxy pyridines and pyrimidines, 2,4-dihydroxyquinoline, 9-methylacridine, 5-pyrazolone, 1-phenyl-3-methyl-5-pyrazolone, 1-phenyl-5-pyrazolone-3-carboxylic acid, acetoacetic acid anilide, benzoylacetic acid anilide, and substituted, fused ring, and other derivatives thereof. Such coupling components may contain any desired auxochrome substituents, solubilizing groups, and the like.

In its preferred embodiment, the fiber-reactive chromophoric compounds of the present invention are water soluble (including ready dispersibility in water) to facilitate application thereof to, and reaction with, the fiber from an aqueous medium. It is accordingly preferred that such fiber-reactive chromophoric compounds contain at least one ionogenic water-solubilizing group, preferably a sulfonic acid group although other such groups are known and may be employed as for example carboxylic, sulfato, sulfatoethoxy, phosphatoethoxy, and the like. Thus, in the production of the azo dyestuffs of Formula VIII above, it is convenient to employ an azo coupling component B as described above containing such water-solubilizing group or groups. Alternatively, such water-solubilizing groups may be inserted into the fiber-reactive chromophoric compound previously or subsequently and/or as a final step as by sulfonation in known manner, etc.

Still another method of making the fiber-reactive chromophoric compounds of the present invention involves reaction of the compound of Formula VII with a chromophoric compound or dyestuff containing a reactive chlorine or bromine atom which may be nuclearly bound or present in a reactive radical such as a sulfonyl chloride group (—SO₂Cl), a chloromethyl group (—CH₂Cl), etc. in the presence of an acid binding agent, followed by sulfation and cyclization. For example, the compound of Formula VII may be reacted with any reactive chlorine-containing compound adapted for subsequent conversion to a chromophoric compound or dyestuff in substance or on the fiber as for example a diazo component or an azo coupling component of an azo dyestuff, or with any known reactive bromine- or chlorine-containing chromophoric compound or dyestuff of the type described above. Thus, reaction of a compound of Formula VII, produced for example by reduction of the reaction product of 2 moles of monoethanolamine with 2,6-bis-chloromethyl-4-nitro-toluene, with bromamine acid, preferably in the presence of an acid-binding agent, followed by sulfation and cyclization yields a fiber-reactive anthraquinone dyestuff operative herein having the formula:

(XI)
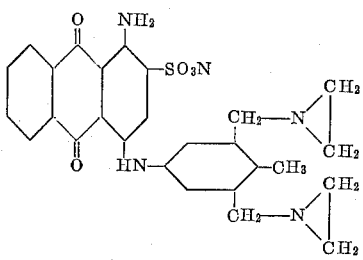

It will be understood that the phenylene ring in the above formula may be instead any other aromatic compound Ar of the type described above.

Similarly, reaction of two moles of the same compound of the Formula VII with one mole of tetrachlorosulfonated copper phthalocyanine followed by sulfation and cyclization yields, for example the water soluble fiber-reactive phthalocyanine of the formula (XII)
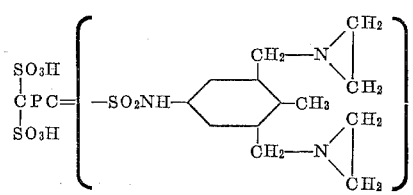

wherein CPC represents the copper phthalocyanine molecule.

In a similar manner, when the foregoing procedure is repeated using 3,6-bischloromethyl-4-methoxy-1-nitronaphthalene instead of the bischloromethyl nitrotoluene, and bis-chloromethyl copper sulfophthalocyanine instead of the tetrachlorosulfonated copper phthalocyanine, there is produced a fiber-reactive water soluble phthalocyanine dyestuff of the formula:

(XIII)
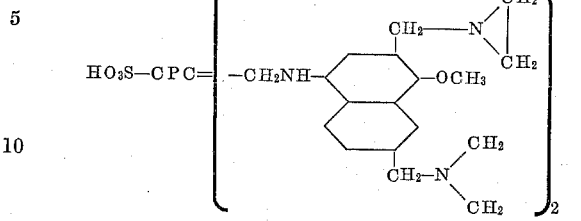

The fiber-reactive chromophoric compounds of the present invention are highly effective for coloring natural and synthetic fibers, preferably those containing an active H atom in the molecule, particularly cellulosic textile fibers, in any desired shades of good to excellent fastness and stability properties. The preferred coloring process involves dyeing (including printing) the fibrous materials by application thereto of an aqueous medium containing a chromophoric compound of the invention (preferably water soluble) at any temperature ranging from ambient temperatures to the boiling point of the medium, said compound thereby reacting with the fiber by ring splitting and addition. The medium may have a pH ranging from about 4 to 14, and preferably contains about 0.5–5% of zinc borofluoride. The medium may be applied in any desired manner, by continuous or batch methods and by immersion, roller application, padding, spraying, brushing, printing or the like. The aqueous medium is preferably a true or colloidal solution, but may also be in the form of a fine dispersion. It will accordingly be understood that the term "water soluble" as applied to the fiber-reactive chromophoric compounds herein is also intended to include ready water dispersibility, particularly since most such compounds and dyestuffs are of high molecular weight and limited water solubility and are applied at relatively low concentrations to the fiber.

The fiber-reactive chromophoric compounds of this invention are applied to the fiber in any desired proportions depending upon the particular compound and fiber, and the depth of shade desired, generally ranging from about 0.5 to 5% based upon the weight of the fiber in the case of overall dyeings. Similarly, for overall dyeing of the fibrous material, the fiber-treating medium will generally contain the fiber-reactive chromophoric compound in a concentration ranging from about 0.5 to 10% or more.

It will be understood that the water in the above described aqueous medium may be replaced in whole or in part by a water miscible, polar organic solvent such as acetone, alcohol, dioxane, dimethylformamide, or the like without departing from the scope of this invention. It will likewise be understood that the medium containing the reactive chromophoric compounds described above may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen-containing compounds as higher molecular weight alcohols, phenols, fatty acids, and the like, and thickening agents for the production of printing pastes such as methyl cellulose, starch, gum arabic, gum tragacanth, locust bean gum, sodium alginate, and the like.

As acid binding or alkalizing agents which may be added to the medium containing the reactive chromophoric compound and/or employed in its production, there may be mentioned generally alkali metal (sodium, potassium, lithium, etc.) hydroxide, carbonate, bicarbonate, phosphate, silicate, borate, acetate or the like, or an organic base such as triethanolamine or the like, when necessary in an amount sufficient to neutralize the liberated acid in whole or in part. Such amount may range from less than 0.5% up to 10% in the medium. Common acids such as HCl, sulfuric, acetic, etc., can be employed for acidification. It is perhaps important to note that the dyestuffs of the present invention can be applied to the fibers under acidic conditions, zinc borofluoride being in fact a preferred agent under such conditions. In the absence of the fibers, however, these dyestuffs precipitate under acid conditions.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium, squeezed to, for example, a 50 to 200% liquor pickup, dried and heated at 90 to 350° C. for an hour or more to 30 seconds or less. A dry heat treatment may be substituted by a steaming or the like if desired. The colored product should finally be washed to remove unreacted dyestuff.

The process of this invention has been found to be highly effective for dyeing and printing cellulosic fibers of natural or synthetic type, such as cotton, linen, wood, paper, regenerated cellulose and the like in any desired shades of good to excellent fastness properties. As a result of the reactive dyeing process of this invention, such dyed or printed cellulose fibers are represented by Formula X above wherein "Fiber" represents a cellulose molecule deprived of a reactive hydrogen atom as originally present for example in hydroxy groups therein. It will be apparent that cross-linking exists, with resultant increased fastness properties when $n$ has a value of 2 or more.

In addition to cellulose and its derivatives, the process of this invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. The resulting dyeings may be ascribed formulae similar to those of the cellulose dyeings described above. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of a staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention.

The following examples are only illustrative of the preesnt invention and are not to be regarded as limitative. All parts and proportions referred to herein and in the appended claims are by weight unless otherwise indicated.

*Example 1*

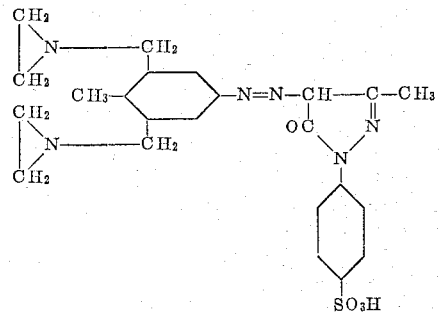

(A) A charge of 500 parts by volume ethanol,
61 parts by weight monoethanolamine, and
46.8 parts by weight 2,6-bis-chloromethyl-4-nitrotoluene stirred at reflux for 2 hours. Then the ethanol distilled off and the remainder stirred with
250 parts water to dissolve.

To the solution is added a solution of 160 parts water, and
32 parts by weight soda ash.

The reaction product precipitates as an oil which settles at the bottom. After decantation of the aqueous layer the oil is dissolved in 180 parts by volume ethanol.

A pressure shaker is charged with the solution, and 0.2 part by weight platinum oxide catalyst (Adam's catalyst). Then hydrogen is charged to a pressure of 60 lbs. The pressure falls to 37 lbs. and then remains constant. After removal of the catalyst by filtration the ethanol is evaporated leaving 2,6-bis-(beta-hydroxy-ethylaminomethyl)-4-aminotoluene.

(B) An amount of 7.3 parts by weight of the intermediate from (A) above is diazotized in HCl solution requiring
19.0 parts by volume of 10% (weight/volume) sodium nitrite solution. The diazonium solution is coupled ice cold with a sodium hydroxide alkaline solution of
11.4 parts by weight of a 60% paste of 1-(4-sulfophenyl)-3-methyl-pyrazolone-5. The dyestuff is precipitated by the addition of sodium chloride and acidification with dilute sulfuric acid. It is filtered off and dried.

An amount of 7.0 parts by weight of this dyestuff is introduced under cooling below 20° C. into
25 parts by volume monohydrate (100% $H_2SO_4$).

After stirring at room temperature for 1 hour the charge is drowned in ice. The dyestuff precipitates. The isolated product is charged into a mixture of 90 parts water and
16.4 parts by volume 20% sodium hydroxide solution. The charge is stirred at reflux for 1 hour resulting in the ethyleneimine ring closure to give the dyestuff of the structure shown above.

(C) The dyestuff can be applied to cotton from a slightly acidic or a neutral or an alkaline bath. Good results are obtained by adding to the dye bath a little zinc borofluoride, $Zn(BF_4)_2$, padding the cotton cloth with the solution, drying at 100° C. and finally heat curing at 150° C. for 3 minutes followed by washing in boiling detergent solution for 5 minutes. A washfast yellow dyeing is obtained.

*Example 2*

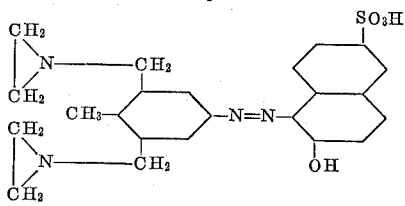

7.3 parts by weight of 2,6-bis(beta-hydroxyethylamino-methyl)-4-amino toluene are added gradually under cooling below 20° C. to 25 parts by volume monohydrate (100% $H_2SO_4$). The charge is stirred at room temperature overnight (about 20 hours). It is then drowned in ice, diazotized and poured into an ice cold NaOH alkaline solution of 4.5 parts by weight 2-naphthol-6-sulfonic acid.

To effect ring closure to the bis-ethyleneimine dyestuff of the above formula, the alkaline solution is refluxed at pH 12 for 1½ hours. The dyestuff is applied to cotton as described in Example 1(C). Orange dyeings are obtained of good washfastness.

*Example 3*

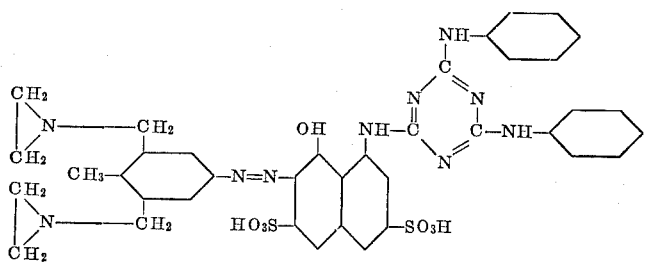

A charge of diazotized 2,6-bis(beta-hydroxyethylamino-methyl)-4-aminotoluene equivalent to 0.7 part by weight of sodium nitrite is prepared in dilute HCl, and the diazonium solution coupled ice cold with an NaOH solution of 5.9 parts by weight of the reaction product of 1 mole of cyanuryl chloride with 2 moles of aniline and 1 mole of H acid(1-amino-8-naphthol-3,6-disulfonic acid). After ice coupling the dyestuff is salted out with sodium chloride, filtered off and dried.

20.1 parts by weight of this dyestuff are introduced under cooling below 20° C. into 40 parts by volume monohydrate.

After stirring for ½ hour at room temperature the charge is drowned in ice. The dyestuff which has precipitated is filtered off and washed with a little ice water. The wet dyestuff cake is introduced into a mixture of 100 parts water and 20 parts by volume 20% sodium hydroxide solution (pH 13).

The resulting solution is refluxed for 1 hour to effect ring closure to produce the two ethyleneimine groups giving the dyestuff of the above formula. The product is applied to cotton as described in Example 1(C). The cotton is dyed washfast red-violet. According to the invention, one or both of the anilino moieties in the above dyestuff may be replaced by a 3,5-bis(ethyleneiminomethyl)-4-methylanilino moiety (the diazo precursor).

*Example 4*

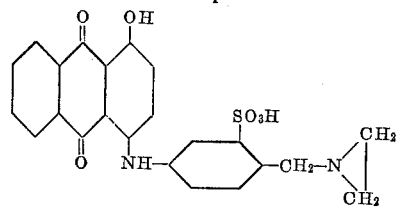

1-hydroxy-4-anilino anthraquinone is chloromethylated, the intermediate reacted with monoethanolamine, the resulting product simultaneously sulfonated and sulfated by reaction with 10% oleum at 100° C., and finally cyclized by treatment with strong NaOH at pH 12–14 to produce the above dyestuff which yields washfast violet dyeings when applied to cotton as described in Example 1(C).

This invention has been disclosed with respect to certain preferred embodiments and various modifications and variations thereof will become obvious to the person skilled in the art. It is to be understood that such modifications and variations are to be included within the spirit and scope of this invention.

We claim:

1. An organic dyestuff selected from the group consisting of azo, anthraquinone and phthalocyanine, from 1 to 4 aromatic nuclear carbon atoms of which are bonded to a radical which has the formula

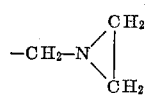

2. An azo dyestuff as defined in claim 1.
3. An anthraquinone dyestuff as defined in claim 1.
4. A phthalocyanine dyestuff as defined in claim 1.
5. A dyestuff as defined in claim 1, two carbon atoms in the same aromatic nucleus of which are each bonded to a radical of said formula.
6. A dyestuff as defined in claim 1 containing in the molecule an ionogenic water-solubilizing group selected from the group consisting of sulfonic, carboxylic, sulfato, sulfatoethoxy, and phosphatoethoxy.
7. A dyestuff of the formula

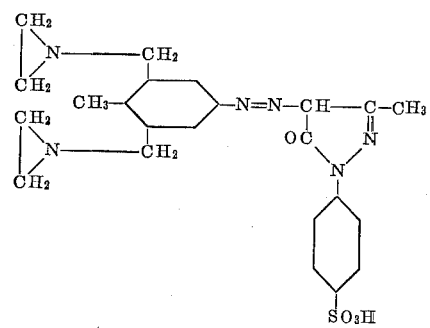

8. A dyestuff of the formula

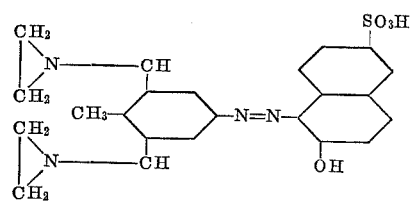

9. A dyestuff of the formula
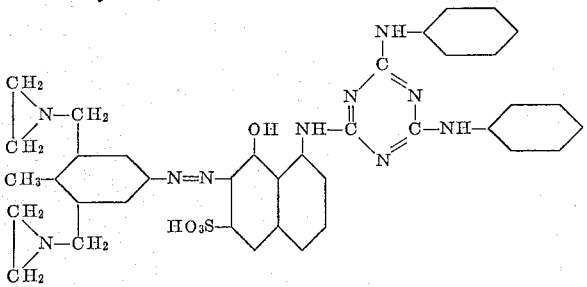
10. A dyestuff of the formula
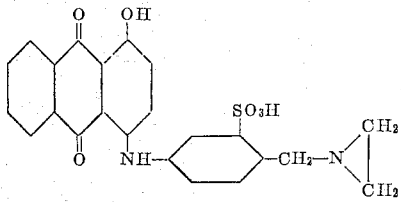
References Cited by the Examiner
UNITED STATES PATENTS
| | | | |
|---|---|---|---|
| 1,886,480 | 11/1932 | Haller et al. | 8—54.2 XR |
| 2,332,047 | 10/1943 | Bock et al. | 8—54.2 XR |
| 2,339,739 | 1/1944 | Blackshaw et al. | 8—54.2 |
| 2,350,188 | 5/1944 | Pinkney | 8—54.2 |
| 2,728,761 | 12/1955 | Wallace et al. | 260—153 |
| 2,795,576 | 6/1957 | Fasciati | 260—153 |
| 3,035,043 | 5/1962 | Benz et al. | 260—152 |
FOREIGN PATENTS
884,446  8/1943  France.
CHARLES B. PARKER, *Primary Examiner.*
NORMAN G. TORCHIN, *Examiner.*
T. J. HERBERT, R. J. FINNEGAN, D. M. PAPUGA,
*Assistant Examiners.*

UNITED STATES PATENT OFFICE
CERTIFICATE OF CORRECTION

Patent No. 3,261,824                  July 19, 1966

David Irwin Randall et al.

It is hereby certified that error appears in the above numbered patent requiring correction and that the said Letters Patent should read as corrected below.

Column 3, lines 7 and 8, for "pyridine-$CO_3$" read -- pyridine-$SO_3$ --; column 5, lines 31 to 43, for that portion of the formula reading "-$SO_3N$" read -- -$SO_3H$ --; lines 57 to to 65, after the right-hand bracket of the formula insert a subscript 2; column 11, for that portion of the first formula reading:

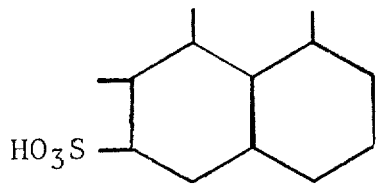 read 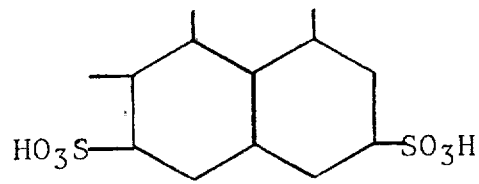

Signed and sealed this 30th day of July 1968.

(SEAL)
Attest:

EDWARD M. FLETCHER, JR.              EDWARD J. BRENNER
Attesting Officer                   Commissioner of Patents